Figure 1:
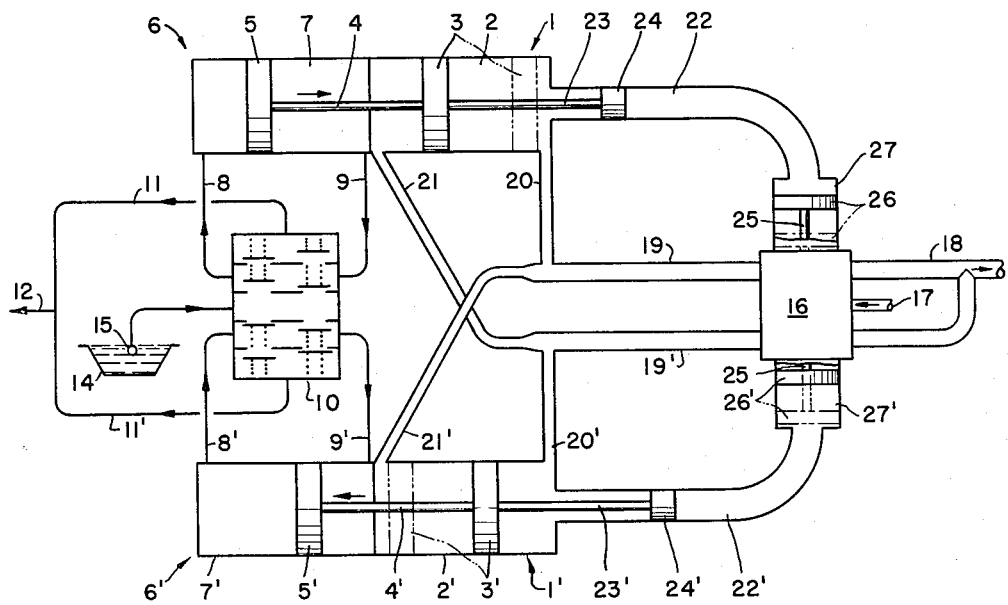

INVENTOR:
HENDRIK K. J. VAN DEN BUSSCHE
BY: J. H. McCarthy
HIS AGENT

INVENTOR:
HENDRIK K. J. VAN DEN BUSSCHE
BY: J. H. McCarthy
HIS AGENT

United States Patent Office 2,965,077
Patented Dec. 20, 1960

2,965,077

PRIME MOVER COMPRISING TWO HYDRAULIC SINGLE-CYLINDER PISTON ENGINES

Hendrik K. J. van den Bussche, Delft, Netherlands, assignor to Shell Oil Company, a corporation of Delaware Filed Sept. 25, 1959, Ser. No. 842,363

Claims priority, application Netherlands Sept. 29, 1958

5 Claims. (Cl. 121—149)

The invention relates to a prime mover comprising two hydraulic single-cylinder piston engines, of which each piston is connected by means of a piston rod to a work-absorbing or work-transferring appliance. Any work-transferring appliance may be a single-cylinder pump of which the piston is directly connected to one of the engine pistons by means of a piston rod. This direct coupling results in a considerable weight saving compared to the coupling provided with rotating parts, so that engine pump units of this type are particularly suitable for use with well drilling installations, since these installations often have to be moved over long distances and across difficult territory.

More especially, the invention relates to a prime mover of the above-mentioned type in which, between the engine pistons or parts connected thereto, a coupling is arranged consisting of a line suitable for being entirely filled with liquid. By means of this liquid coupling a constant phase difference is maintained between the movements of the pistons of the two piston engines, and differences in the rod forces occurring in the two piston rods are equalized. In the case of prime movers comprising two single-acting single-cylinder piston engines, the work required for the return stroke of one piston is supplied by the other piston by means of this liquid coupling. Moreover, the use of the hydraulic coupling has the advantage that both piston engines can be placed side by side, thus resulting in a considerable reduction in the overall length of the prime mover.

In order to ensure smooth working of a prime mover of the above-mentioned type, one reversing valve is used for the supply and discharge of hydraulic medium to and from the cylinder spaces of the two piston engines. The common reversing valve is alternately moved by the piston in one of their extreme positions.

The object of the invention is to reverse the valve, i.e., the control of the moving part of the reversing valve by the moving engine pistons, in a simple manner.

To this end, according to the invention, when the engine is in operation the displacement of the reversing valve is derived from the displacement of the liquid present in the line.

To this end the control rod of the reversing valve is provided on both sides with a piston each of which is movable in a cylinder, and the line is divided into two sections each of which communicates with one of the cylinders.

In this construction it is important, however, that the desired phase difference between the moving pistons, and hence the relative position of the pistons and the reversing valve should be maintained. Accordingly, a further object of the invention is to keep constant the quantities of liquid in both sections of the line.

To this end each engine piston in its extreme positions controls a valve mechanism which in the one extreme position is capable of supplying liquid to the section of the line adjacent to the corresponding engine piston, and in the other extreme position is capable of withdrawing liquid from this section of the line.

For this purpose each engine piston is preferably provided with an auxiliary rod having two stops, and a valve is arranged around each auxiliary rod, which valve is normally closed, but can be opened by one of the stops in one of the extreme positions of this engine piston so that communication is established between the corresponding line section and a low-pressure reservoir, a second valve being arranged around each auxiliary rod, which valve is normally closed, but in the other extreme position is opened by the second stop, so that communication is established between the corresponding line section and a reservoir filled with liquid under high pressure.

Figure 2:
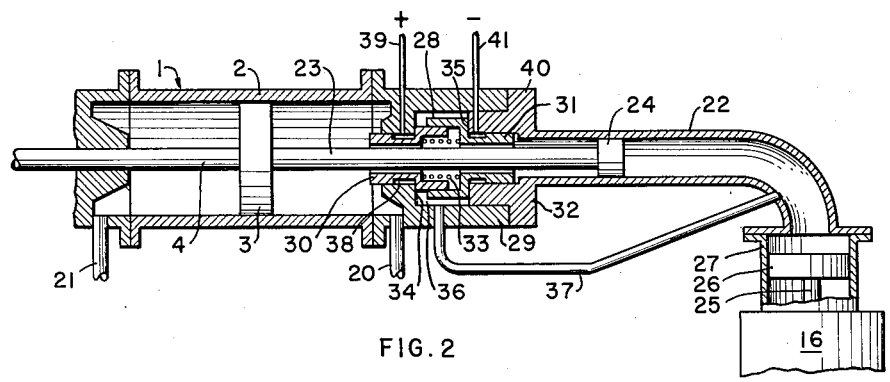
Figure 3:
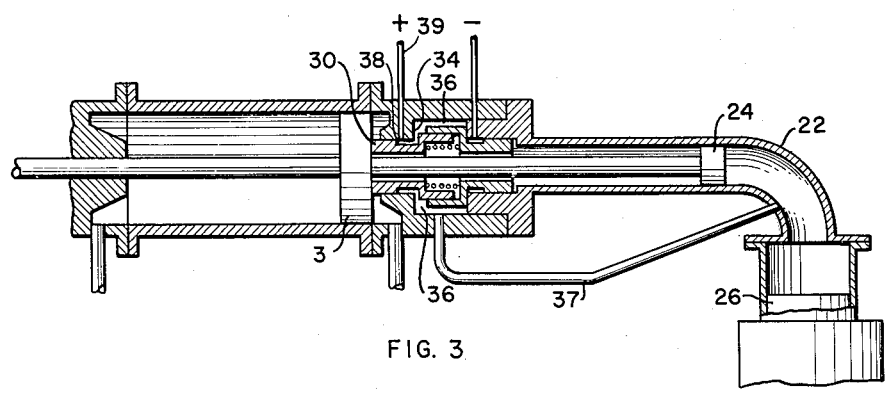
Figure 4:
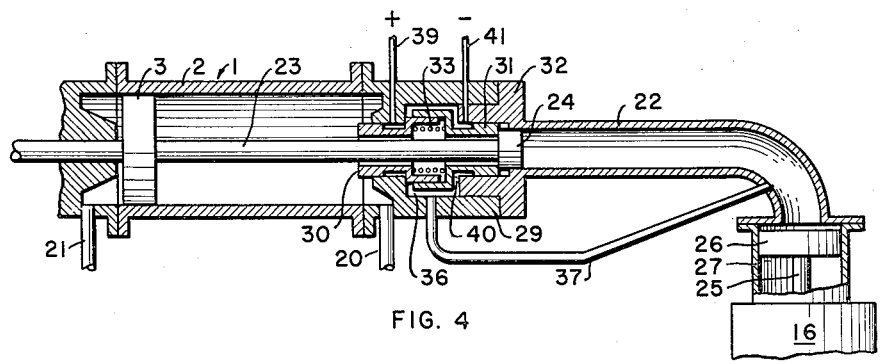

The invention will be described in greater detail with reference to the drawings, in which Figure 1 is a diagram of a prime mover comprising two piston engines of which each piston rod is connected to a piston of a pump, and Figures 2, 3 and 4 are diagrams of one of the valve mechanisms by means of which the quantity of liquid in one of the line sections is kept constant.

The prime mover shown in Figure 1 comprises two piston engines 1 and 1', with parallel longitudinal axes. These piston engines are of the double-acting design and each comprises a cylinder 2 (2'), an engine piston 3 (3') and a piston rod 4 (4') connected to the pump piston 5 (5') of a double-acting pump 6 (6'). The ends of each mud pump cylinder 7 (7') communicate, by means of the fluid flow lines 8 and 9 (8' and 9') with a valve manifold housing 10 containing a group of spring-loaded valves, which housing 10 is common to both pumps and from which delivery lines 11 and 11' lead to the common delivery line 12. In addition the suction line 13, which on one side is provided with the filter 15 present in the mud reservoir 14, is connected to the suction side of the valve housing 10.

Hydraulic medium is supplied and discharged to and from the piston engines 1 and 1' by means of a reversing fluid flow control valve 16 which is common to both engines. This valve should be of the type in which there is sudden reversal when the valve rod has almost completed its stroke. On one side of the valve 16 are connected the supply line 17 and the discharge line 18, and on the other side the lines 19, 20, 21 and 19', 20' and 21' constitute the fluid conduit connections between the reversing valve 16 and the two ends of the cylinders 2 and 2'. It is clear that in one position of the reversing valve 16, the supply line 17 (leading from a high-pressure reservoir to the valve) will communicate with the lines 19', 20' and 21 through the valve body 16 (not shown) and the ports arranged in the slide face (not shown) of the valve, and the discharge line 18 will simultaneously communicate with the lines 19, 20 and 21'. In the other position of the reversing valve 16, the latter set of lines communicate with the supply line 17 and the former set with the discharge line 18.

The hydraulic coupling is formed by the two chambers or conduit sections 22 and 22' which are filled with liquid, and are each closed on one side by the auxiliary piston 24 (24') connected to the engine piston 3 (3') by means of an auxiliary piston rod 23 (23'), and on the other side by a piston 26 (26') which is secured to a valve rod 25 and is movable in a cylinder 27 (27').

When the prime mover is in operation both conduit sections 22 and 22' are filled with liquid.

In the position shown in Figure 1, the position of the valve mechanism 16 is such that engine piston 3 is moving to the right and engine piston 3' to the left as indicated by the arrows. When considering the surfaces of the engine pistons on which the high-pressure liquid operates, which liquid is supplied through the lines 21 and 20′, and the active surfaces of the pump pistons 5 and 5′, it is found that during the stroke in the direction shown in Figure 1 the piston engine 1 has a work surplus compared to the piston engine 1′. The work surplus is due to the fact that in the double-acting pump of Figure 1 the active area of the right-hand face of pump piston 5 is greater than the active area on the left-hand face of pump piston 5′ when considering the area taken up by the piston rod 4. This work surplus is now distributed over the two engines 1 and 1′ during the stroke by means of the auxiliary pistons 24 and 24′, the liquid present in the line sections 22 and 22′, the pistons 26 and 26′ and the control rod 25 of the valve 16.

When engine piston 3 has completed its stroke, engine piston 3′ has also completed its stroke (see the positions indicated in broken lines), the quantities of liquid in the corresponding line sections 22 and 22′ being moved over such a distance that the control rod 25 with the pistons 26 and 26′ is shifted to the position indicated in broken lines. At that moment the reversing valve 16 is reversed, so that communication is established between the lines 19′, 20′ and 21 and the discharge line 18, and between the lines 19, 20 and 21′ and the supply line 17. The subsequent movement of the pistons is then opposite to the direction of the arrows shown in Figure 1 until, in the other extreme positions of the pistons, the reversing valve 16 is again reversed to its first described position.

To ensure that the prime mover operates properly, the quantities of liquid in the line sections 22 and 22′ should remain constant; there will be no great difficulties so long as the pressure differences over the auxiliary pistons 24 and 24′ and the pistons 26 and 26′ do not become excessive. When there are great pressure differences, however, there is a risk of leakage along the said pistons, as a result of which the engine pistons 3 and 3′ will cease to synchronize.

In order to overcome this drawback a valve mechanism is provided in each engine which is operated in the extreme positions of an engine piston, and in these positions, according to requirements, will be able to supply any deficit of liquid in the conduit part adjacent to the corresponding engine piston, or will be able to discharge any excess liquid.

Figures 2, 3 and 4 show a detail of the piston engine 1, the line section 22 and a part of the reversing mechanism 16 shown in Figure 1, the piston engine being provided with a valve mechanism 28 of the type referred to above.

This valve mechanism is arranged around the auxiliary rod 23 and consists of a valve housing 29 secured to the cylinder 2, which valve housing also serves as a cylinder cover. In the valve housing 29 are arranged two coaxially slidable valves 30 and 31 which are enclosed therein by means of a cover 32. By the action of a spring 33 positioned between the valves 30 and 31, the valves are pressed on to separate seats 34 and 35 arranged or formed in the valve housing 29 and cover 32. A line 37 issues into a preferably annular space 36 between these valve seats 34 and 35 and communicates on the other side with the line 22 of the liquid coupling. In the normal closed position of the valves 30 and 31, the space 36 only communicates with the line section 22 (see Figure 2). When the valve 30 is opened (this being done by means of the right-hand side of the engine piston 3 when this engine piston is in its extreme right-hand position (see Figure 3)), the space 36 is also brought in communication with a source of or a space filled with a high-pressure liquid, by means of the annular channel 38 and the conduit or channel 39 arranged in the valve 30. This space or source of high pressure liquid is shown in Figures 2, 3, and 4 by means of a + sign. If, however, the engine piston 3 moves to its extreme left-hand position (see Figure 4), the valve 41 is lifted or moved from its seat 35 by means of the auxiliary piston 24, as a result of which the space 36 is also brought in communication with a low-pressure space or discharge area by means of the annular channel 40 arranged in valve 31 and the conduit or channel 41. This space or discharge area is shown in Figures 2, 3 and 4 by means of a — sign.

The normal stroke of the engine piston 3 is now within the positions in which slide valve 30 is opened by engine piston 3 (see Figure 3) and slide valve 31 by auxiliary piston 24 (see Figure 4). The stroke volume displaced over this distance by the auxiliary piston 24 is now equal to the stroke volume of the piston 26 required to reverse the reversing valve 16. It will be clear that the desired displacement of the piston 26 as a result of the displacement of auxiliary piston 24, and hence of engine piston 3, can only be effected provided a certain quantity of liquid is present in the line section 22. Should this quantity decrease, for example owing to leakage along the auxiliary piston 24 or the piston 26, there is no reversal of the valve 16 at the moment when the engine piston 3 arrives at the right-hand position of its normal stroke. At this stage the engine piston 3′ has not yet arrived at the left-hand position of its normal stroke, and without the presence of the valve mechanism 28 the hydraulic engine would stop moving. In the present case, however, the engine piston 3 will continue to run beyond the right-hand position of its normal stroke to its extreme right-hand position in which it opens the valve 30 (see Figure 3). At this stage communication is established between the space filled with high-pressure liquid and a line section 22 of the liquid coupling through channel 39, annular space 38, space 36 and line 37. While the engine piston 3 remains in the extreme position shown in Figure 3, the engine piston 3′ (Figure 1) continues to run to the left-hand position of its normal stroke and the piston 26 (and hence also the piston 26′) continues to move in proportion to the displacement of the engine piston 3′ since the quantity of liquid in the line section 22 is supplemented from the high-pressure space. When this piston 3′ has arrived at the end of its normal stroke, the reversing mechanism 16 begins to operate, since the pistons 26 and 26′ have then simultaneously reached the end of their stroke. The supply and discharge conduits of the piston engines 1 and 1′ are interchanged upon reversal of the reversing valve 16.

If, however, the quantity of liquid in the line section 22 is greater than usual owing to leakage from the cylinder 2 to the line section 22, the engine piston 3, when it moves to the left, will have arrived at the left-hand position of its normal stroke before the piston 26 has reached its highest reversing position. The engine piston 3 then runs on to its extreme left-hand position (see Figure 4), opening the slide valve 31 by means of the auxiliary piston 24, as a result of which communication is established between the line section 22 through the line 37, the space 36, the annular channel 40 and the channel 41 and the low-pressure space. Since the engine piston 3′ has still not yet reached the right-hand position of its normal stroke, surplus liquid is removed from the line section 22 owing to the continued movement of this piston and the resultant displacement of the piston 26′ and 26. The valve 16 reverses at the moment when piston 3′ reaches the right-hand position of its normal stroke.

If, in the above-described case in which excess liquid is present in the line section 22, there is also a deficit of liquid in the line section 22′, the excess being, in an absolute sence, smaller than the deficit, the piston 3′ will reach the right-hand position of its normal stroke before the piston 26′ has arrived at the reversing position. Piston 3′ then runs on to its extreme right-hand position (compare the position of piston 3 as shown in Figure 3), as a result of which communication will be established through the valve 30′ between the line 22′ and the tank filled with high-pressure liquid (valve 30′ and line section 22′ of the piston engine 1′ are not shown in the drawing, but correspond to valve 30 and line section 22 respectively belonging to the piston engine 1). Piston 3 then runs on to its extreme left-hand position, liquid under pressure being supplied to the line section 22′. In this extreme left-hand position of piston 3 (see Figure 4) valve 31 is opened, as a result of which communication is established between the line section 22 and the low-pressure space. Since the line section 22′ communicates with the high-pressure space there follows a rapid reversal of the reversal valve 16 when the engine pistons 3 and 3′ are stationary. The piston 3 and 3′ subsequently move in the opposite direction, but in this case with the correct quantities of liquid in the line sections 22 and 22′.

If there is an excess of liquid in both sections 22 and 22′ of the liquid coupling, the excess in one of the sections is first removed, the excess in the remaining section being drawn off at the following stroke.

In the same way, when there is a deficit of liquid in both sections, the deficit in one of the sections is first made up and the deficit in the other section at the following stroke.

It follows from the above that the prime mover can be started up from any position of the engine pistons and that the correct quantities of liquid will be present in the sections 22 and 22′ of the liquid coupling after only two strokes. Provided care is taken to ensure proper venting of the line sections, the prime mover can also be started up from all piston positions in which the line sections 22 and 22′ are wholly or partly filled with air.

It should be observed that the volumes of the two sections 22 and 22′ in which the liquid coupling is divided by the pistons 26 and 26′ need not be the same, although in general this will be the case. It is only important that the quantity of liquid present in these sections which couple together the displacements of the pistons 24 and 26 and 24′ and 26′ respectively should be kept constant.

I claim as my invention:

1. A prime mover comprising two hydraulic single-cylinder piston engines having inlet and outlet conduit means for supplying and discharging a hydraulic medium to and from the cylinder spaces of the two piston engines, reversing valve means in said inlet and outlet conduit means to said piston engines, and work-transferring fluid coupling means connected between said engine pistons, said fluid coupling means being operatively connected in open hydraulic communication at all times to said reversing valve means for repeatedly changing said valve means from one position to another during operation of said prime mover.

2. A prime mover comprising two hydraulic single-cylinder piston engines having inlet and outlet conduit means for supplying and discharging a hydraulic medium to and from the cylinder spaces of the two piston engines, reversing valve means in said inlet and outlet conduit means to said piston engines, said reversing valve means having a control rod, piston means connected to said rod means, cylinder means surrounding said piston means, and work-transferring fluid coupling means comprising fluid-filled conduit means in open hydraulic communication at all times between each piston engine and one side of said cylinder means surrounding said piston means of said reversing valve means, said fluid coupling means being operatively connected to said reversing valve means for repeatedly changing said valve means from one position to another during operation of said prime mover.

3. A prime mover comprising two hydraulic single-cylinder piston engines having inlet and outlet conduit means for supplying and discharging a hydraulic medium to and from the cylinder spaces of the two piston engines, reversing valve means in said inlet and outlet conduit means to said piston engines, said reversing valve means having a control rod, piston means connected to said rod means, cylinder means surrounding said piston means, and work-transferring fluid coupling means comprising fluid-filled conduit means connected between said each piston engine and one side of said cylinder means surrounding said piston means of said reversing valve means, said fluid coupling means being operatively connected to said reversing valve means for repeatedly changing said valve means from one position to another during operation of said prime mover, inlet and outlet means to and from said fluid coupling means for selectively supplying and discharging a pressure fluid thereto and therefrom, valve means in said inlet and outlet means of said fluid coupling means, said valve means being operable by said engine pistons in the extreme stroke positions thereof to open selectively one of said valves to adjust the volume of fluid in said fluid coupling means whereby a constant phase difference is maintained between the movements of the pistons of the two piston engines.

4. A prime mover comprising two hydraulic single-cylinder piston engines having inlet and outlet conduit means for supplying and discharging a hydraulic medium to and from the cylinder spaces of the two piston engines, reversing valve means in said inlet and outlet conduit means to said piston engines, said reversing valve means having a control rod, piston means connected to said rod means, cylinder means surrounding said piston means, and work-transferring fluid coupling means comprising fluid-filled conduit means connected between said each piston engine and one side of said cylinder means surrounding said piston means of said reversing valve means, said fluid coupling means being operatively connected to said reversing valve means for repeatedly changing said valve means from one position to another during operation of said prime mover, each engine piston having an auxiliary rod connected thereto and slidable therewith extending into said fluid-filled conduit means, an auxiliary piston carried at the end of said rod for reciprocation within said fluid-filled conduit means, valve-operating stop means carried on said auxiliary rod, inlet and outlet means to and from said fluid coupling means for selectively supplying and discharging a pressure fluid thereto and therefrom, valve means in said inlet and outlet means of said fluid coupling means, said valve means being operable by said stop means in the extreme stroke positions thereof to open selectively one of said valves to adjust the volume of fluid in said fluid coupling means whereby a constant phase difference is maintained between the movements of the pistons of the two piston engines.

5. The apparatus of claim 4 wherein the valve-operating stop means are formed by said engine piston at one end of said auxiliary rod and said auxiliary piston at the other end of said auxiliary rod.

References Cited in the file of this patent

UNITED STATES PATENTS

| | | |
|---|---|---|
| 2,137,551 | Valentine | Nov. 22, 1938 |
| 2,141,731 | Wolfrom et al. | Dec. 27, 1938 |
| 2,698,517 | Witt | Jan. 4, 1955 |